March 7, 1961  D. A. DA ROS  2,974,297
CONSTANT PHASE SHIFT ROTATOR
Filed April 28, 1959

INVENTOR
DINO A. DA ROS
BY
*Henry Huff*
ATTORNEY

United States Patent Office 2,974,297
Patented Mar. 7, 1961

2,974,297

CONSTANT PHASE SHIFT ROTATOR

Dino A. Da Ros, Astoria, N.Y., assignor to Sperry Rand Corporation, Great Neck, N.Y., a corporation of Delaware Filed Apr. 28, 1959, Ser. No. 809,437

4 Claims. (Cl. 333—98)

This invention relates to a microwave device for rotating the plane of polarization of linearly polarized electromagnetic waves, and more particularly relates to a device for rotating the plane of polarization of electromagnetic waves throughout a range of angles without introducing any substantial variation in the relative phase shift of the rotated waves.

In recent years "Faraday rotators" have been used extensively in microwave systems to rotate the plane of polarization of electromagnetic waves. Faraday rotators as commonly used may be comprised of a section of hollow circular waveguide having a member of gyromagnetic material disposed therein, and includes means for providing a unidirectional magnetic field for magnetizing the gyromagnetic member in a direction parallel to the longitudinal axis of the waveguide. The magnetized gyromagnetic member possesses the property of presenting phase constants of different values to oppositely rotating circularly polarized waves, and because a linearly polarized wave may be analyzed as being composed of two counter rotating circularly polarized wave components, these two wave components propagate through the gyromagnetic member with different phase velocities and will thus experience a relative phase displacement with respect to each other. These two circularly polarized components will combine at the output end of the gyromagnetic member to produce a linearly polarized wave whose plane of polarization has been rotated through some angle. The phase constants of the two circularly polarized wave components, and thus the angle of rotation of the linearly polarized wave will be a function of the frequency of the wave, the composition and shape of the gyromagnetic member, and the strength of the unidirectional magnetic field which magnetizes the gyromagnetic member.

The angle of rotation produced by the Faraday rotator may be expressed as $$\theta = \frac{(B_- - B_+)L}{2} \quad (1)$$

wherein $B_+$ represents the phase constant of a right-hand circularly polarized wave, $B_-$ represents the phase constant of a left-hand circularly polarized wave component, and $L$ represents the length of the gyromagnetic member.

In addition to experiencing a rotation of their plane of polarization the waves propagating through the gyromagnetic member also experience a relative phase shift which may be expressed as $$\phi = \frac{(B_- + B_+)L}{2} \quad (2)$$

The direction of rotation produced by the Faraday rotator will be either clockwise or counterclockwise depending upon the direction of the longitudinally directed unidirectional magnetic field. The phase shift, however, is always of the same sense, being a relative phase delay. The term "relative phase shift" denotes the phase shift experienced by a rotated wave relative to a phase shift which would be experienced by the wave propagating through the hollow circular waveguide having the gyromagnetic member disposed therein, but wherein the gyromagnetic member is not magnetized.

It may therefore be seen that in a Faraday rotator an inherent relative phase shift accompanies the rotation and its magnitude is dependent upon the angle through which the plane of polarization is rotated by the Faraday rotator. This change in the relative phase shift which occurs as the angle of polarization is varied is objectionable in some microwave system applications. It is therefore sometimes desirable to maintain the phase shift substantially constant as the angle of polarization varies.

It is therefore an object of this invention to provide a microwave polarization rotating means which produces a substantially constant relative phase shift.

Another object of this invention is to provide a microwave polarization rotator for rotating the plane of polarization of microwave energy and for maintaining a substantially constant net phase shift for a rotation to any angle of polarization within a range of angles.

A further object of this invention is to provide a microwave device for rotating the plane of polarization of microwave energy through a range of angles without producing any substantial variation in the relative phase shift in the energy so rotated.

It is a further object of this invention to provide a substantially constant phase shift Faraday rotator.

These and other objects of the invention which will become more apparent from the specification and claims below, are accomplished in a Faraday type rotator by providing a polarization selective phase shifting means at the output end of said rotator. The polarization selective phase shifting means produces a relative phase shift which is a function of the angle of polarization of the linearly polarized wave incident thereon.

In one embodiment of this invention the polarization selective phase shifting means produces a maximum phase shift in a wave which propagates through the rotator without any substantial rotation of its plane of polarization, and produces a minimum phase shift in a wave which is rotated ninety degrees by the rotator. The maximum phase shift produced by the polarization selective phase shifting means is substantially equal in magnitude to the phase shift produced by the rotator when rotating the plane of polarization of the wave ninety degrees. For waves having any given angle of polarization lying between zero and ninety degrees the phase shifter produces a relative phase shift which differs from a constant value by an amount substantially equal to the phase shift produced by the rotator when rotating the wave to that given angle. In this manner the polarization selective phase shifting means produces a phase shift which always complements the phase shift produced by the rotator, and produces a net substantially constant phase shift for any angle of rotation between zero and ninety degrees in a given direction. In another embodiment of the invention the polarization selective phase shifting means produces a relative phase shift which is always substantially equal in magnitude and opposite in sense to the relative phase shift produced by the gyromagnetic member, therefore resulting in a net substantially constant zero phase shift for any angle of rotation up to ninety degrees in a given direction.

A fuller understanding of the present invention may be achieved by referring to the following figures wherein.

Figure 1:
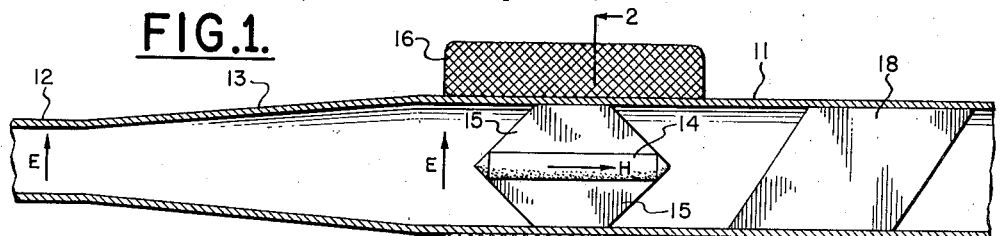
Fig. 1 is a longitudinal sectional view of one embodiment of the present invention.
Figure 2:
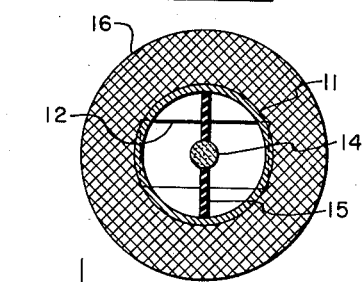
Fig. 2 is a transverse sectional view taken at section 2—2 of Fig. 1.

Referring now in particular to Figs. 1 and 2, a section of non-resonant hollow circular waveguide 11 is coupled to an input rectangular waveguide section 12 by means of a rectangular-to-circular waveguide transition section 13. Circular waveguide section 11 is dimensioned to propagate electromagnetic waves only in the $TE_{11}$ mode. Disposed coaxially within circular waveguide section 11 is an elongated member 14 of ferrimagnetic material which is supported in place by thin, low loss, dielectric members 15. The supporting means for ferrimagnetic member 14 should not produce any relative phase shift between the two orthogonal wave components of a linearly polarized wave propagating through waveguide section 11. Supporting members 15 may therefore be made of a dielectric material which has a dielectric constant substantially equal to unity if waveguide section 11 is hollow. Members 15 are tapered at their leading and trailing edges in order to reduce reflections in waveguide 11. Disposed coaxially about waveguide section 11 in the region occupied by ferrimagnetic member 14 is a magnetizing coil 16 for immersing ferrimagnetic member 14 in a unidirectional magnetic field H directed along the longitudinal axis of circular waveguide section 16. Magnetizing coil 16 is energized from a unidirectional source of potential $E_b$. Current flow through coil 16 may be varied by means of potentiometer 17 to vary the strength of the magnetic field H. A thin planar sheet of low loss dielectric material 18 is diametrically disposed in circular waveguide 11 adjacent the end of ferrimagnetic member 14 opposite the input rectangular waveguide section 12. A source of microwave electromagnetic energy, not shown, may be coupled to input rectangular waveguide section 12, and a utilization means, not shown, may be coupled to the opposite end of non-resonant circular waveguide section 11.

Member 14 may be comprised of any material which possesses the properties of being gyromagnetic, that is, any material having electrons whose magnetic moments may be aligned in a given direction by an applied unidirectional magnetic field wherein the magnetic moments of the electrons precess about their direction of alignment by an applied microwave magnetic field. Ferrimagnetic materials and garnet materials, and some gasses, for example, possess these properties and are well known to those skilled in the art.

Planar dielectric member 18 is permeable to microwave energy and has a dielectric constant greater than unity. Member 18 functions as a polarization selective phase shifting means and produces a phase delay in a linearly polarized wave propagating therethrough which is a function of the angle of polarization of the wave relative to the diametral plane of dielectric member 18. A phase shifter of this type is described in U.S. Patent 2,599,753. Dielectric member 18 produces a maximum phase delay in linearly polarized waves polarized parallel to its diametral plane and produces a minimum phase delay in linearly polarized waves polarized perpendicularly to its diametral plane. Waves polarized at angles between the two orthogonal polarizations just mentioned will be retarded in phase by an amount which is equal to the product of the maximum phase delay produced by member 18 times the consine of the angle between the plane of polarization of the incident waves and the diametral plane of member 18. The maximum relative phase shift produced by dielectric member 18 in waves at a given frequency is dependent upon its dielectric constant, its length, and its thickness. As will be explained more fully herebelow, dielectric member 18 is proportioned to produce a maximum relative phase delay considerably less than ninety degrees in waves propagating therethrough.

In the operation of the device of Fig. 1, linearly polarized traveling electromagnetic waves from a source (not shown) propagate in rectangular waveguide section 12 in the $TE_{10}$ mode, pass through rectangular-to-circular waveguide transition section 13, and are launched into circular waveguide section 11 in a vertically polarized $TE_{11}$ circular waveguide mode. The vertically polarized waves will then be incident on ferrimagnetic member 14, and in propagating therethrough their plane of polarization will be rotated through some angle $\theta$ which is dependent upon the strength of the longitudinally directed magnetic field H produced by magnetizing coil 16. In propagating through ferrimagnetic member 14 the waves will also experience a relative phase delay which is dependent on the angle of rotation of their plane of polarization. The rotated waves will then be incident on planar dielectric member 18 polarized at said angle $\theta$ with respect to the diametral plane of dielectric member 18. Dielectric member 18 will operate in the manner described above to produce a relative phase delay in the waves propagating therethrough which is a cosine function of the angle of polarization of said waves. This phase shift may be expressed as $\phi_P = \phi_M \cosine \theta$, where $\phi_M$ is the maximum relative phase delay produced by dielectric member 18 in waves polarized parallel thereto, and $\theta$ is the angle of polarization of incident waves with respect to the diametral plane of dielectric member 18. In waves polarized at an angle $\theta$, the relative phase delay produced by polarization selective phase shifting means 18 is of a magnitude which differs from a constant value by an amount which is equal to the magnitude of the relative phase delay produced by ferrimagnetic member 14 when rotating those waves through said angle $\theta$.

The manner in which the device of this invention produces a substantially constant relative phase shift in waves rotated any angle within a given range of angles will be explained in connection with Fig. 3, wherein the curve $\phi_R$ represents the relative phase delay produced by ferrimagnetic member 14 as a function of current through magnetizing coil 16, and $\phi_P$ is a curve representing the relative phase delay produced by dielectric member 18 as a function of the rotation of the waves. The curve designated $\theta$ represents the rotation of the plane of polarization of waves propagating through ferrimagnetic member 14 as a function of the magnetizing current. The dielectric constant and the length and thickness of dielectric member 18 are proportioned to produce a maximum relative phase delay in waves which are not rotated by ferrimagnetic member 14, wherein this maximum relative phase delay is substantially equal to the maximum relative phase delay produced by ferrimagnetic member 14 when rotating the plane of polarization of waves through an angle of ninety degrees. Dielectric member 18 is also proportioned to produce a minimum relative phase delay in waves polarized perpendicularly thereto, wherein this minimum relative phase delay is substantially equal to the relative phase delay produced by ferrimagnetic member 14 in waves which are not rotated in passing therethrough. The addition of the phase shift curves $\phi_R$ and $\phi_P$ will produce a substantially constant total relative phase delay $\phi_T$. It may therefore be seen that waves propagating through the device of Fig. 1 will experience substantially the same relative phase shift for any angle of rotation of their plane of polarization within the range of zero to ninety degrees in a given direction.

Although the constant phase shift Faraday rotator just described is limited in its operation to rotation of substantially ninety degrees in a given direction, this is sufficient for most Faraday rotator applications, inasmuch as most Faraday rotators are not required to rotate the plane of polarization of waves more than ninety degrees.

Figure 3:
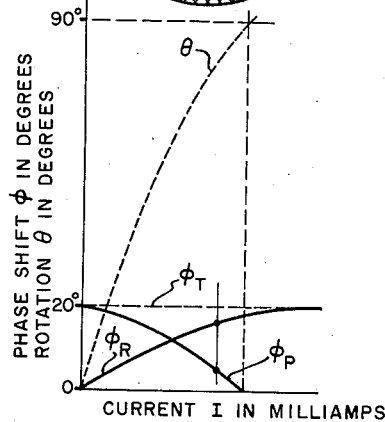
Fig. 3 is a plot of curves used as an aid in explaining the operation of the device illustrated in Fig. 1.

It will be evident that the device of this invention will also produce a substantially constant relative phase shift for a rotation in a direction opposite to the direction assumed in Fig. 3. This results from the fact that the phase shift curves $\phi_R$ and $\phi_P$ are symmetrical with respect to the vertical axis of Fig. 3 (even functions), while the rotation curve $\theta$ is symmetrical about the origin (odd function). This characteristic may be made use of in some Faraday rotator devices, in modulators for example wherein each of two orthogonally disposed polarization selective output terminals are connected to circular waveguide section 11 and are oriented respectively at forty-five degrees to the polarization of linearly polarized waves coupled into waveguide section 11. In these devices modulation of waves propagating in waveguide section 11 is accomplished by providing a magnetic biasing field for ferrimagnetic member 14 which varies in magnitude and sense about a zero value in accordance with a modulating signal. It will be evident to those familiar with the art that with the arrangement described and illustrated in Fig. 1, substantially constant relative phase shift operation will again be achieved.

A constant phase shift Faraday rotator which was constructed substantially as illustrated in Fig. 1 had the following physical and electrical characteristics:

| | |
|---|---|
| Size of circular waveguide section 11 | 1.468" I.D. |
| Type of ferrimagnetic material | Type #3347, manufactured by General Ceramics and Steatite Corporation. |
| Dimensions of ferrimagnetic rod | .365" diameter, 3.75" long. |
| Type of dielectric for dielectric member 18 | "Teflon," dielectric constant 2.1. |
| Dimensions of dielectric member 18 | 4.75" x 1.468" x .062". |
| Magnetizing coil | 4.718" long 10,500 turns of #32 copper wire. |
| Range of variation of magnetizing current | 0–37 ma. |
| Range of variation of angle of polarization | 0–70 degrees. |
| Range of variation of net resultant phase shift | −1 to +2.5 degrees. |

It should be noted that the polarization selective phase shifter 18, as disclosed in Fig. 1, will have some tendency to cause a linearly polarized wave to become elliptically polarized when passing therethrough. However, in most practical applications the degree of ellipticity would ordinarily not be objectionable because the phase shift produced by the Faraday rotator will usually not exceed approximately twenty degrees. The maximum ellipticity produced by phase shifting means 18 will therefore be something less than twenty degrees, which can be tolerated in most applications.

It should also be noted that the constant phase shift characteristics just described do not necessarily hold true for propagation of waves in the direction opposite to that just described, since dielectric member 18 will then produce a relative phase shift independently of the phase shift produced by ferrimagnetic member 14.

Figure 4:
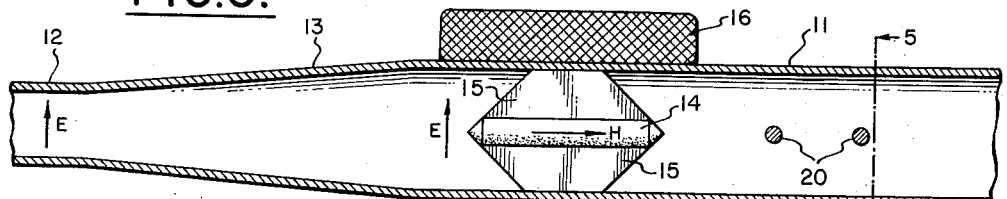
Fig. 4 is a longitudinal sectional view of another embodiment of the present invention.
Figure 5:
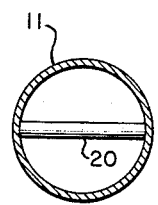
Fig. 5 is a transverse sectional view taken at section 5—5 of Fig. 4.

Another embodiment of the present invention which produces a substantially constant relative phase shift of zero degrees for rotation of the plane of polarization within a range of angles of ninety degrees in a given direction is illustrated in Fig. 4. The embodiment of this invention illustrated in Fig. 4 is quite similar to the embodiment illustrated in Fig. 1, except for the polarization selective phase shifting means employed. Corresponding components of Figs. 1 and 4 are designated by corresponding numerals. In Fig. 4 an input rectangular waveguide section 12 is coupled through rectangular-to-circular waveguide transition section 13 to circular waveguide section 11. The Faraday rotator comprised of ferrimagnetic member 14, magnetizing coil 16, and voltage biasing source $E_b$, is identical to that illustrated in Fig. 1. The polarization selective phase shifting means 20 is comprised of conductive rods 20 which extend diametrically across the interior of waveguide section 11 to provide inductive susceptances in the waveguide. The longitudinal axes of conductive rods 20 lie in a plane which is perpendicular to the polarization of the input waves launched into circular waveguide section 11 from input rectangular waveguide section 12, that is, perpendicular to the diametral plane of dielectric member 18 as illustrated in Fig. 1, see Fig. 5. Conductive rods 20 comprise a polarization selective phase shifting means of the type disclosed in U.S. Patent 2,438,119, and produce a maximum relative phase advance in waves polarized parallel to the longitudinal axes of rods 20, and produce a minimum relative phase advance in waves polarized perpendicularly thereto. In a manner analogous to that described above in connection with polarization selective phase shifting means 18, the relative phase advance produced by conductive members 20 varies as a cosine function of the angle of polarization of the waves incident thereon. The magnitude of the relative phase advance produced by conductive members 20 is determined by their diameters and by their spacing, which are best determined experimentally. The maximum relative phase advance produced by members 20 is chosen to be substantially equal to the relative phase delay produced by ferrimagnetic member 14 when rotating the plane of polarization of waves through an angle of ninety degrees, and the minimum relative phase advance produced by members 20 is proportioned to be substantially equal to the relative phase delay produced by ferrimagnetic member 14 in waves which propagate therethrough without any substantial rotation of their plane of polarization. It is to be understood that conductive rods 20 are intended to be examples only of polarization selective phase advancing means. Any polarization selective relative phase advancing means may be employed in this embodiment of the invention.

In the operation of the device of Fig. 4 input vertically polarized electromagnetic waves propagate from rectangular waveguide section 12 through rectangular-to-circular waveguide transition section 13 and are launched into circular waveguide section 11 in a vertically polarized $TE_{11}$ circular waveguide mode. The vertically polarized waves propagate through ferrimagnetic member 14 and are rotated through an angle $\theta$ which is dependent upon the strength of the longitudinally directed unidirectional magnetic field H produced by magnetizing coil 16. The waves rotated by ferrimagnetic member 14 are then incident upon conductive members 20 which produce a relative phase advance that is equal to the product of the maximum relative phase advance produced by members 20 times the cosine of the angle between the plane of polarization of the waves incident thereon and the diametral plane of members 20, i.e. $\phi_P = \phi_M \cos \theta$.

Figure 6:
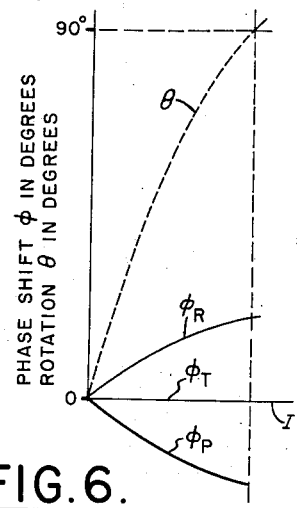
Fig. 6 is a plot of curves used to help explain the operation of the device of Fig. 4.

By referring to Fig. 6 it may be seen that the relative phase shift $\theta_R$ produced by ferrimagnetic member 14 increases as the angle of rotation $\theta$ increases, and to an approximation represents a sinusoidal function. The relative phase shift produced by polarization selective conductive members 20 also increases in magnitude, but in an opposite sense, as the plane of polarization of the waves is rotated. By properly selecting the maximum and minimum relative phase advances produced by conductive members 20, in the manner described above, the relative phase shifts produced by the Faraday rotator and the polarization selective phase shifting means 20 will combine to produce a net total relative phase shift of substantially zero degrees; this phase shift remaining substantially constant for any plane of polarization between approximately zero and ninety degrees in a given direction.

It may therefore be seen that by the means described above a substantially constant phase shift polarization rotator may be constructed by placing a polarization selective phase shifting means in a circular waveguide section immediately following a Faraday rotator, and by causing the polarization selective phase shifting means to produce relative phase shift which differs from a constant value by an amount substantially equal to the relative phase shift produced by said Faraday rotator.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A constant phase shift polarization rotator for producing output waves having a desired substantially constant value of relative phase shift irrespective of angle of rotation comprising a non-resonant section of circular waveguide adapted to propagate traveling electromagnetic waves, polarization selective means coupled to one end of said circular waveguide for launching therein linearly polarized traveling electromagnetic waves at a given angle of polarization, Faraday rotating means positioned within said waveguide for rotating the plane of polarization of said waves throughout a range of angles of substantially 90°, said rotating means also producing in said waves a relative phase shift which increases when the angle of rotation is increased from said given angle by said rotating means, and means in said waveguide for compensating for the varying phase shift with rotation produced by said rotating means to produce a substantially constant phase shift in output waves irrespective of angle of rotation within said range, said compensating means comprising a polarization selective phase shifter which produces a phase shift whose magnitude is a function of the angle of polarization of electromagnetic waves incident thereon, said polarization selective phase shifter being designed to produce in waves at any angle of polarization within said range a phase shift which differs from a constant value of relative phase shift by substantially the magnitude of relative phase shift produced by said rotating means when rotating the plane of polarization of waves to a corresponding angle, said constant value of relative phase shift being the desired constant value of phase shift of output waves.

2. A constant phase shift polarization rotator for producing output waves having a desired substantially constant value of relative phase shift irrespective of angle of rotation comprising a non-resonant section of circular waveguide adapted to propagate traveling electromagnetic waves, polarization selective means coupled to one end of said circular waveguide for launching therein linearly polarized traveling electromagnetic waves at a given angle of polarization, Faraday rotating means positioned within said waveguide for rotating the plane of polarization of said waves throughout a range of angles of substantially 90°, said rotating means also producing in said waves a relative phase shift which increases when the angle of rotation is increased from said given angle by said rotating means, and means in said waveguide for compensating for the varying phase shift with rotation produced by said rotating means to produce a substantially constant phase shift in output waves irrespective of angle of rotation within said range, said compensating means comprising polarization selective phase shifting means which produces a phase shift whose magnitude is a function of the angle of polarization of the electromagnetic waves incident thereon, said polarization selective phase shifting means producing in waves incident thereon at a first angle of polarization a minimum of phase shift substantially equal to zero and producing in waves incident thereon at an angle of 90° with respect to said first angle of polarization a maximum phase shift substantially equal to the relative phase shift produced by said rotating means when rotating the polarization of electromagnetic waves 90° from said given angle, said polarization selective phase shifter being designed to produce in waves at any angle of polarization within said range a phase shift which differs from a constant value of relative phase shift by substantially the magnitude of relative phase shift produced by said rotating means when rotating the plane of polarization of waves to a corresponding angle.

3. The combination claimed in claim 2 wherein said polarization selective phase shifting means produces in waves at any angle of polarization within said range a phase shift substantially equal in magnitude and opposite in sense to the relative phase shift produced by said rotating means when rotating waves to a corresponding angle within said range.

4. The combination claimed in claim 2 wherein said polarization selective phase shifting means produces said minimum phase shift in waves which have been rotated by substantially 90° by said rotating means and produces said maximum phase shift in waves which have passed through said rotating means without any substantial change in polarization from said given angle of polarization.

References Cited in the file of this patent

UNITED STATES PATENTS

| | | |
|---|---|---|
| 2,438,119 | Fox | Mar. 23, 1948 |
| 2,599,753 | Fox | June 10, 1952 |
| 2,767,379 | Mumford | Oct. 16, 1956 |
| 2,857,574 | Anderson | Oct. 21, 1958 |

OTHER REFERENCES

Scharfman: "Proceedings of the IRE," October 1956, pages 1456–1459.